Figure 1:
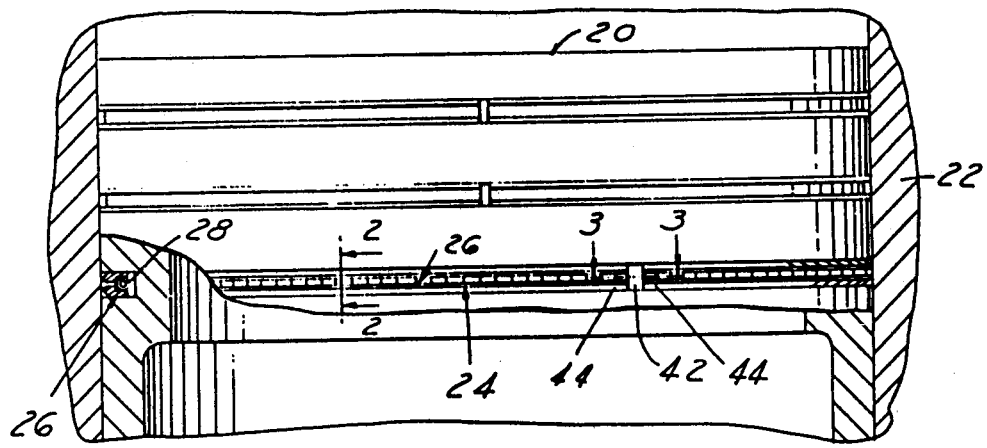

United States Patent [19]

Hendrixon et al.

[11] 4,247,972
[45] Feb. 3, 1981

[54] METHOD OF MANUFACTURING A PISTON RING

[75] Inventors: John L. Hendrixon, Shelby; Robert R. Rositch, Spring Lake, both of Mich.

[73] Assignee: Sealed Power Corporation, Muskegon, Mich.

[21] Appl. No.: 6,847

[22] Filed: Jan. 26, 1979

Related U.S. Application Data

[62] Division of Ser. No. 872,157, Jan. 25, 1978, Pat. No. 4,161,321.

[51] Int. Cl.³ .............................................. B23P 15/06
[52] U.S. Cl. ................................ 29/156.63; 29/156.6; 219/10.57; 219/121 LM
[58] Field of Search .......................... 29/156.63, 156.6; 219/10.57, 121 LM, 121 L, 121 LE, 121 LF; 277/216, 163, 224, 218, 220, 219, 223, 138, 236, DIG. 1, DIG. 6, 163

[56] References Cited

U.S. PATENT DOCUMENTS

| 2,278,019 | 3/1942 | Phillips | 277/216 |
|---|---|---|---|
| 2,280,552 | 4/1942 | Somes | 219/10.57 |
| 2,362,810 | 11/1944 | Farr | 277/216 |
| 2,487,587 | 11/1949 | Phillips | 29/156.6 |
| 2,495,474 | 1/1950 | Phillips | 29/156.6 |
| 3,087,842 | 4/1963 | Borras | 29/156.63 |
| 3,459,432 | 8/1969 | Reussner | 277/163 |
| 3,955,823 | 5/1976 | Willem | 277/163 |
| 3,973,098 | 8/1976 | Harris | 29/156.6 |
| 4,045,036 | 8/1977 | Shunta | 277/200 |

FOREIGN PATENT DOCUMENTS

| 496107 | 11/1938 | United Kingdom | 277/216 |
|---|---|---|---|
| 1295410 | 11/1972 | United Kingdom | 277/216 |

*Primary Examiner*—Daniel C. Crane
*Attorney, Agent, or Firm*—Barnes, Kisselle, Raisch & Choate

[57] ABSTRACT

A parted annular piston sealing ring and a method for manufacture thereof wherein an inwardly facing ring surface adapted to be engaged by an expander-spring for expanding the ring into sealing engagement with a cylinder wall is hardened in a zone immediately adjacent the parted ring tips. Hardening of the spring-engaging surface at the ring tips reduces wear and embedment between the ring and spring in the region of the ring gap while permitting resilient flexure of the ring in regions removed from the ring gap to follow surface variations in a cylinder wall.

9 Claims, 5 Drawing Figures

U.S. Patent  Feb. 3, 1981  4,247,972

METHOD OF MANUFACTURING A PISTON RING

This is a division of application Ser. No. 872,157, filed Jan. 25, 1978 now U.S. Pat. No. 4,161,321.

The present invention relates to piston rings and to methods for manufacture thereof. More particularly, the invention relates to a method for reducing the problems of wear and embedment between a piston ring and an expander-spring in a reciprocating piston internal combustion engine.

In prior art oil control rings of the type described using a parted annular relatively soft cast iron sealing ring and a harder metallic expander-spring, high unit loading between the ring and spring about the inside ring diameter causes wear to both parts. Wear may become excessive and lead to embedment of the spring into the ring which unitizes the two parts causing loss of oil control and ultimate engine failure. This wear and embedment problem is particularly acute in the region of the part or gap in the sealing ring where there is a greater amount of relative movement between the ring and spring during installation and operation. Prior art approaches to the wear and unitization problem include spring design modification as in Willem U.S. Pat. No. 3,955,823, oil ring geometry changes in the region of the ring gap as in Reussner U.S. Pat. No. 3,459,432, and spacers or shims disposed between the ring and spring as in Willem and in Shunta U.S. Pat. No. 4,045,036. Chrome plating of the inside ring diameter has also been attempted, but has been found to be unduly expensive and to cause excessive wear on the spring.

Objects of the present invention are to provide a piston sealing ring and a method for manufacture thereof which are economical in manufacture and reliable in operation, and which reduce or eliminate the problems of wear and embedment between the sealing ring and an expander-spring.

Figure 2:
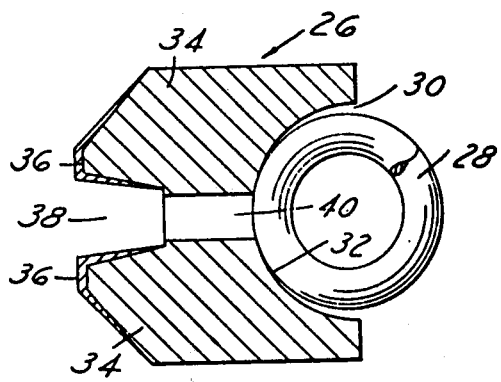
Figure 3:
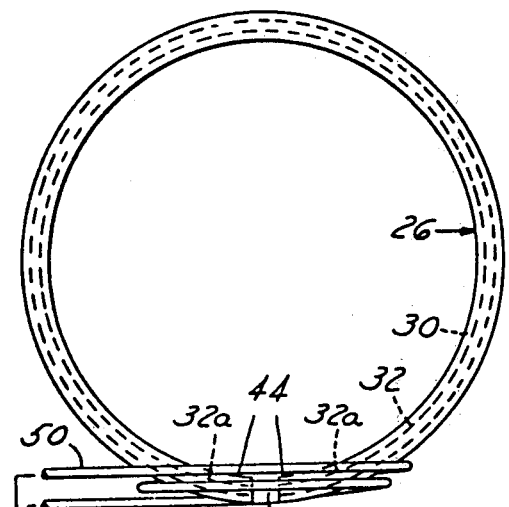
Figure 4:
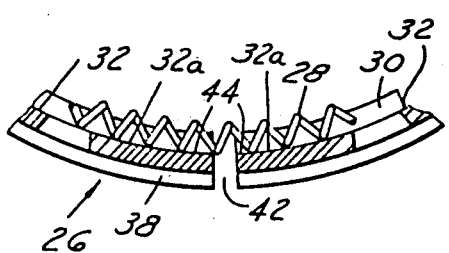
Figure 5:
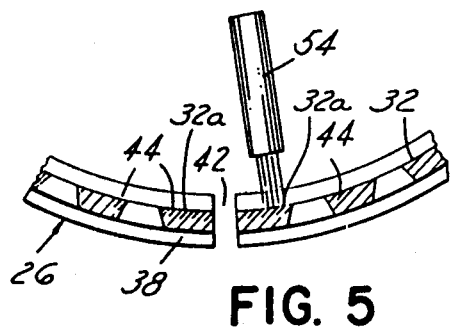

The invention, together with additional objects, features and advantages thereof, will be best understood from the following description, the appended claims and the accompanying drawings in which:

FIG. 1 is a fragmentary view of a cylinder and a piston equipped with an oil ring assembly which includes a sealing ring in accordance with the invention, portions of the piston and ring being broken away to illustrate ring assembly;

FIGS. 2 and 3 are sectional views taken along the respective lines 2—2 and 3—3 in FIG. 1;

FIG. 4 is a partially sectioned plan view schematically illustrating one method of ring manufacture in accordance with the invention; and FIG. 5 is a partial view similar to that of FIG. 4 showing an alternative method of ring manufacture in accordance with the invention.

Referring to FIG. 1, a conventional piston 20 is disposed to reciprocate within the cylinder 22 of a gasoline- or diesel-power internal combustion engine. Piston 20 is provided with the usual peripheral groove in which at least one oil control ring assembly 24 is disposed. Referring to FIGS. 2-3 which illustrate oil ring assembly 24 in greater detail, the assembly comprises a parted annular cast iron sealing ring 26 and an annular coiled expander-spring 28 disposed internally of ring 26 within the associated piston groove, spring 28 being disposed in an opposing radially inwardly facing spring receiving groove or channel 30 in ring 26. Spring 28 is adapted to expand circumferentially against the opposing surface 32 of ring groove 30, whereby ring 26 is expanded by spring 28 in the circumferential direction into sealing engagement with the opposite wall of cylinder 22 (FIG. 1).

The radially outer or sealing edge of ring 26 has a pair of outwardly tapering frustoconical side portions 34 which are chrome plated as at 36 to reduce ring wear. An annular oil collecting channel 38 is provided between ring portions 34 and is connected with inner ring channel 30 by a plurality of circumferentially elongated radially inwardly tapering oil drain vents or ports 40 arrayed circumferentially about the ring. Parted ring 26 has a ring gap 42 defined by opposed ring tips 44 to permit circumferential flexure of ring 26 for following contour variations in the opposing cylinder wall.

In accordance with the present invention, wear between sealing ring 26 and expander-spring 28 is reduced and embedment is prevented by hardening the spring-engaging ring surface 32. Specifically, and in accordance with a critical feature of the invention, ring surface 32 is hardened only at ring tips 44 in the zone or region immediately adjacent ring gap 42, which leaves the remainder of the ring circumference in a soft condition better to permit the ring to expand and contract circumferentially to follow the cylinder bore without fatigue or fracture. The hardened portions of ring tips 44 adjacent the ring gap are illustrated in dense cross section in FIG. 3, as compared with the remainder of the ring circumference. In testing of the present invention, a sealing ring of hardenable ductile cast iron was utilized having the following composition: 3.10–3.70% C., 2.0–2.6% Si, 0.05% max S, 0.1% max P, 0.6–0.9% Mn, 0.15–0.35% Cr, 0.15–0.35% Mo, 0.7–1.0% Ni, 0.02–0.07% Mg and the balance iron. The ring possessed a martensitic micro-structure which was then tempered to facilitate machining to a hardness of Rockwell-B 95–106. When the ring tips are hardened pursuant to the invention to Rockwell-C 50 minimum, preferably to Rockwell-C 55–60, the hardened portion assumes an untempered martensitic microstructure. The hardened portion of ring surface 32 is illustrated at 32a in FIG. 3. Spring 28, which may be of 302 stainless steel spring stock, may have a hardness of Rockwell-C 40.

One method of hardening ring surface 32 at ring tips 44 is illustrated schematically in FIG. 4 wherein an induction heating coil 50 encompasses opposed ring tips 44 and is connected to a suitable source 52 of a high frequency electrical signal. When induction hardening is employed the ring tips are hardened throughout their cross sections. In accordance with one method of ring manufacture, the ring tips are induction heated to a temperature on the order of 1400° to 1650° F. and then oil quenched. These induction hardening steps are preferably carried out prior to the steps of deposition of chrome plating 36 (FIG. 2), lapping of the chrome plating, milling of oil drain vents 40 and grinding of the axial ring side walls. These subsequent machining operations have been found to remove most or all ring distortion which may have been caused by induction heating of the ring tips and subsequent quench. It has not been considered necessary to draw back or temper the oil ring after the induction hardening operation because the heat-treated area is near the gap 42 where dynamic stresses are very low and the somewhat brittle characteristics of fully hardened ring tips are not detrimental. Preferably, oil drain vents 40 are not machined in the induction through-hardened area at ring tips 44. In one working embodiment of an induction hardened ring 26 having a design "bore diameter" (diameter of cylinder 22) of 5.5 inches, ring surface 32 was hardened over arcs of 0.75 inches in both directions from gap 42. State-of-the-art tolerances for non-precision induction hardening apparatus are such that a tolerance of plus or minus 0.25 inches must be allowed in specifying the lengths of the hardenedtip arcs. For this reason, it is anticipated that arc lengths on the order of 0.75 inches will be useful for sealing rings of other bore diameters.

FIG. 5 illustrates an alternative method for hardening spring-engaging ring surface 32 wherein radiant energy, as from a laser 54, is directed onto surface 32 adjacent ring gap 42, preferably after drain ports 40 are machined and chrome plating 36 is deposited, etc. The laser hardening method illustrated schematically in FIG. 5 has the advantage of being self-quenching, and also of hardening only the surface of the ring groove adjacent gap 42 as illustrated in FIG. 5 by the dense cross lining at surface portions 32a. The laser hardening technique results in little or no distortion of the ring tips, and thus may be carried out at a final stage of ring manufacture. Again, hardened arc lengths on the order of 0.75 inches are contemplated. During a number of evaluation tests and after only two hundred hours of continuous operation in a specially designed test fixture, oil rings of the type illustrated in FIG. 2 without the hardened ring surface portions 32a were found to have a depth of embedment adjacent ring gap 42 averaging around two thousandths of an inch. Under similar test conditions, laser and induction hardened rings as hereinabove described had no measurable wear in the hardened ring surface areas 32a adjacent the ring gap or in the surface 32 spaced from the ring gap.

Although the invention has been illustrated and discussed in connection with a presently preferred ring composition and assembly, it will be appreciated that hardenable rings of other compositions and cross sectional configurations, and circumferentially compressable expander springs of other geometries are contemplated. Similarly, laser 54 (FIG. 5) may be replaced by a suitable maser or the like for directing radient energy onto ring surface 32 for surface heating and hardening adjacent the ring gap. Indeed, it is possible that other heat sources such as a torch may be used to heat-harden the ring tips, although such modification for carrying out the invention may result in undue distortions in the ring geometry. However, the invention is intended to embrace the above-noted and all other alternatives, modifications and variations as fall within the spirit and broad scope of the appended claims.

The invention claimed is:

1. In a method of manufacturing a piston oil ring assembly for a reciprocating piston engine which comprises a parted annular sealing ring adapted to be disposed in a piston ring groove and a separate expander-spring disposed in said groove to engage a radially inwardly directed ring surface of substantially constant diameter for expanding said ring into sealing engagement with a cylinder wall, a method of impeding potential wear between said expander-spring and first portions of said ring surface adjacent the ring tips during operation against a cylinder wall and embedment of said expander-spring into said ring surface, said method comprising the steps of forming said ring as a one-piece parted annular integral member of generally uniform material composition and hardness with a said radially inwardly directed ring surface of substantially constant diameter, and then hardening said ring surface only adjacent said ring tips while maintaining said generally uniform material composition and substantially constant diameter such that said first portions of said ring surface adjacent said ring tips are substantially hardened as compared with the remainder of said ring surface and portions of said ring extending between said first portions so as to impede said wear and embedment adjacent said ring tips while permitting resilient flexure in said portion of said ring extending between said first portions to follow surface variations in a cylinder wall in sealing engagement therewith.

2. The method set forth in claim 1 wherein said step of hardening said ring surface comprises the step of directing radiant electromagnetic energy onto said ring surface adjacent said ring tips.

3. The method set forth in claim 1 wherein said step of hardening said ring surface comprises the step of laser hardening said ring surface adjacent said ring tips.

4. The method set forth in claim 1 wherein said step of hardening said ring surface comprises the step of through-hardening said parted ring tips.

5. The method set forth in claim 4 wherein said step of through-hardening said ring tips comprises the step of induction hardening said ring tips.

6. The method set forth in claim 1 wherein said first portions extend over an arc on the order of three-quarters of an inch from each of said ring tips.

7. The method set forth in claim 1 which includes the additional step of machining said ring, including oil drain portions extending radially through said ring, and wherein said step of hardening said ring surface includes the steps of induction heating and quenching said ring tips prior to said step of machining said ring, such that said step of machining said ring simultaneously operates to reduce distortions in said ring resulting from said steps of induction heating and quenching said ring tips.

8. The method set forth in claim 1 wherein said ring is formed of hardenable cast iron having a hardness in the range of Rockwell-B 95-108, and wherein said ring surface is hardened adjacent said ring tips to Rockwell-C 50 minimum.

9. The method set forth in claim 8 wherein said ring surface is hardened to Rockwell-C 55-60.

* * * * *

UNITED STATES PATENT AND TRADEMARK OFFICE
CERTIFICATE OF CORRECTION

PATENT NO. : 4,247,972

DATED : February 3, 1981

INVENTOR(S) : John L. Hendrixon and Robert R. Rositch

It is certified that error appears in the above-identified patent and that said Letters Patent are hereby corrected as shown below:

FIG. 4 in the drawings should be designated "FIG. 3" and

FIG. 3 in the drawings should be designated "FIG. 4".

Signed and Sealed this

Fourteenth Day of July 1981

[SEAL]

Attest:

Attesting Officer

GERALD J. MOSSINGHOFF

Commissioner of Patents and Trademarks